United States Patent [19]

Reinartz et al.

[11] Patent Number: 5,213,482

[45] Date of Patent: May 25, 1993

[54] HYDRAULIC RADIAL-TYPE PISTON PUMP

[75] Inventors: Hans D. Reinartz, Frankfurt am Main; Peter Volz, Darmstadt; Bernd Schopper, Kriftel; Dalibor Zaviska, Frankfurt am Main, all of Fed. Rep. of Germany

[73] Assignee: Alfred Teves GmbH, Frankfurt am Main, Fed. Rep. of Germany

[21] Appl. No.: 751,913

[22] Filed: Aug. 29, 1991

[30] Foreign Application Priority Data

Sep. 1, 1990 [DE] Fed. Rep. of Germany ....... 4027794

[51] Int. Cl.$^5$ ............................................. F04B 1/04
[52] U.S. Cl. .................................... 417/273; 303/10; 303/116.4; 417/540; 417/523
[58] Field of Search ............... 417/540, 554, 273, 523, 417/525, 552, 553; 60/581; 303/10, 116 PC

[56] References Cited

U.S. PATENT DOCUMENTS

| | | | |
|---|---|---|---|
| 3,413,929 | 12/1968 | Cook et al. | 417/273 |
| 4,568,131 | 2/1986 | Blomberg et al. | 303/116 PC |
| 4,730,879 | 3/1988 | Adachi et al. | 303/116 PC |
| 4,861,234 | 8/1989 | Joy et al. | 417/273 |
| 4,875,741 | 10/1989 | Ozawa et al. | 303/116 PC |
| 4,988,147 | 1/1991 | Zirps | 303/10 |

FOREIGN PATENT DOCUMENTS

| | | | |
|---|---|---|---|
| 3146454 | 6/1983 | Fed. Rep. of Germany | 417/540 |
| 7060 | 6/1990 | World Int. Prop. O. | 417/540 |

*Primary Examiner*—Leonard E. Smith
*Attorney, Agent, or Firm*—Robert P. Seitter; J. Gordon Lewis

[57] ABSTRACT

A radial piston pump is described with dual pistons which are slidingly accommodated within a bushing coupled end to end to a valve body. Automatically controlled suction and discharge valves for a pressure chamber are arranged one behind the other in the longitudinal axis of the pump. The pistons are sealed by means of elastomeric seals compressed by an end of the valve body and bushing under pressure of a threaded sealing plug installed in the pump housing. The valves, valve body and bushing form a cartridge separately assembled and installed as a unit in the housing. The threaded sealing plug is formed with a damping chamber for damping of pressure pulsations.

25 Claims, 2 Drawing Sheets

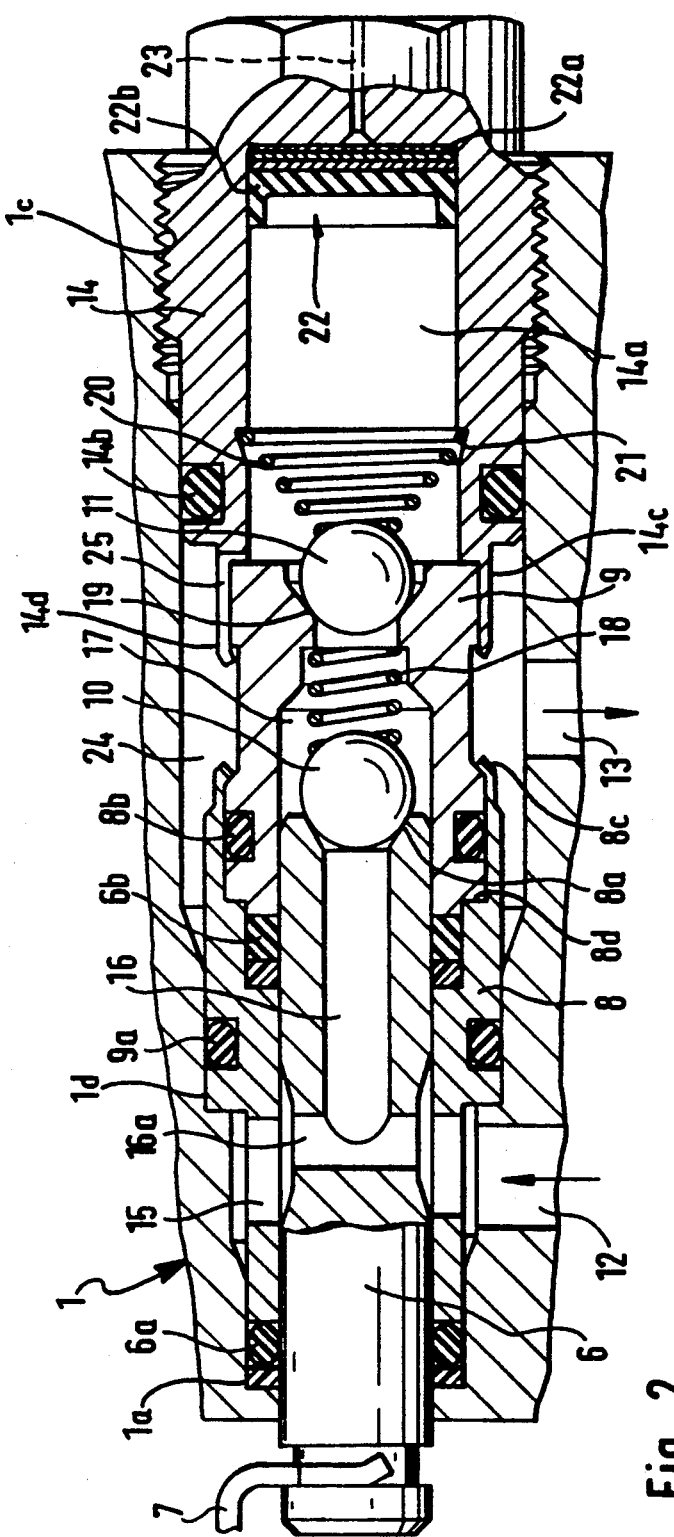
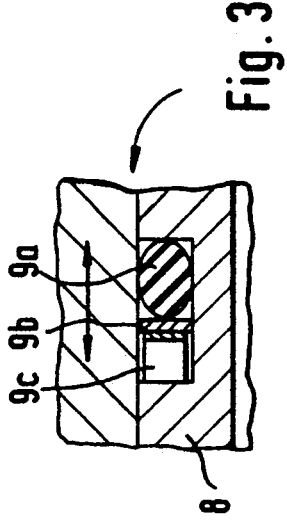
Fig. 2
Fig. 3

HYDRAULIC RADIAL-TYPE PISTON PUMP

The invention is related to a hydraulic radial piston type pump with at least one piston driven to perform working strokes, the piston slidingly accommodated within a hollow cylinder-shaped valve body. A suction and a discharge valve are positioned aligned one behind the other within the valve body. The suction and discharge valves are automatically controlled to open and close communication of inlet and outlet ports with the pump pressure chamber wherein hydraulic fluid is compressed by movement of one end of the piston. The suction valve has its valve seat at the one end of the piston. The inlet port provides for inflow of the hydraulic fluid to the pressure chamber and the outlet port provided for delivery of the pressurized hydraulic fluid to the system requiring pressurized fluid. A pump holding accommodates the piston and valve body pump components, the pressure chamber being defined in the inner space of the valve body and the valve seat being shaped out at the one end of the piston body.

A radial piston pump of this kind has become known from the German patent application published without examination (1st publication), no. 3,742,824.

This state-of-the-art radial piston pump has the following disadvantages:

The pump piston is furnished with a so-called split seal or slot seal with respect to the valve body, respectively with respect to the bushing. That means that both parts are required to be manufactured with utmost precision and, beyond that, must be individually selected so as to fit each other in pairs. This requirement increases manufacturing costs.

It is the object of the invention to provide an improved hydraulic radial-type piston pump of the type described above providing improved sealing of a very simple and compact design which may be manufactured at a low cost.

It is a further object to incorporate certain pressure pulsation dampening noise reducing features in this type of pump.

SUMMARY OF THE INVENTION

According to the invention, this object is achieved in that a separate bushing is provided secured end to end to the valve body, the bushing compressed by a threaded sealing plug to compress an annular elastomeric seal at either end of the bushing, sealing to the outside of the piston.

To seal off the piston by a compressed elastomeric seal has the added advantage that the piston is retained in the assembly and cannot slip out of the bushing.

In accordance with the invention, the annular seal adjacent the driven end of the piston, accomplishes two sealing functions insofar as it seals both the bushing to the piston and the bushing to the housing.

A further feature particularly offering special ease of assembly, is provided by a separate assembly of the valve body, bushing, pump piston and threaded sealing plug, allowing its installation and removal as a unit, i.e., as a cartridge.

In order to avoid any lost stroke at the beginning of the pressure stroke, it will furthermore be of advantage that the suction valve be in the closed condition in its starting position. This provision will moreover afford that the pump is filled with hydraulic fluid, is vented and is subsequently tested by the manufacturer. During the transport to the end-user the hydraulic fluid used during testing will remain in the pressure chamber, which is sealed by the suction valve and the discharge valve as well as by the annular elastomeric seals.

According to another space saving development of the invention a cavity acting as a damping chamber is formed in the threaded sealing plug.

The arrangement of a damping element in radial piston pumps has, as such, become known in the art by the German patent application published without examination (1st publication), No. 3,808,901. In this prior-art pump, the suction valve is positioned with its longitudinal axis at right angles to the longitudinal axis of the discharge valve, i.e., transversely with respect to the piston travel. The pump elements are positioned each separately in recesses of the pump housing and cannot be removed from the housing as a unit. Although the state-of-the-art pump is low-noise and is damped with regard to the pressure pulsations, it is complicated and bulky.

In order to boost the damping effect, the valve body is, according to another feature of the invention, surrounded by an annular pressure chamber which is in fluid communication with the damping chamber as with bores, passage slots or through a restrictor and which is connected to the outlet. The annular pressure chamber is arranged in series with the damping chamber, and increases the damping volume available for the suppression of pressure pulsations.

In the interests of a further reduction of the pressure pulsations, a flow restriction is positioned directly in the outlet according to still another feature of the invention.

A particularly pronounced silencing is obtained by positioning at least one damping diaphragm at the external front side in the damping chamber, which diaphragm is allowed to bend in the direction of the slightly outwardly curved front side of the end wall of the damping chamber in the event of pressurization of the damping chamber. A minute diaphragm-type pressure accumulator is established by this measure. If the threaded sealing plug is furnished with a vent opening, then the diaphragm (in conjunction with a cup-shaped boot) will constantly seal off the damping chamber with respect to the atmospheric pressure. Without this opening, the pressure between the diaphragm and the front side would be allowed to increase.

Noise abatement is improved by the elastic seals acting with respect to the pump housing to simultaneously bring about a silencing effect due to their elasticity. For the suppression of noises caused by axial vibrations, a spring element is positioned against the seal.

A particularly compact and simple structure is provided by configuring the suction valve and the discharge valve as a spring-loaded ball valve.

When the inventive pump is applied in a hydraulic automotive vehicle brake system equipped with an anti-locking device and featuring separate brake circuits, and when each one of the pistons supplies a respective brake circuit, then it will be possible to tailor each piston output to the volumetric requirements of each circuit by selecting appropriate respective piston diameters while using the same piston stroke.

Other features and advantages of the invention will be revealed by the embodiments illustrated in the drawings.

DESCRIPTION OF THE DRAWINGS

FIG. 2 is an enlarged partial cross sectional view of one of the piston pumps shown in FIG. 1 with a slight variation in some details;

FIG. 3 is a further enlarged sectional view of a variation of the housing seal shown in FIG. 2.

DETAILED DESCRIPTION

Figure 1:
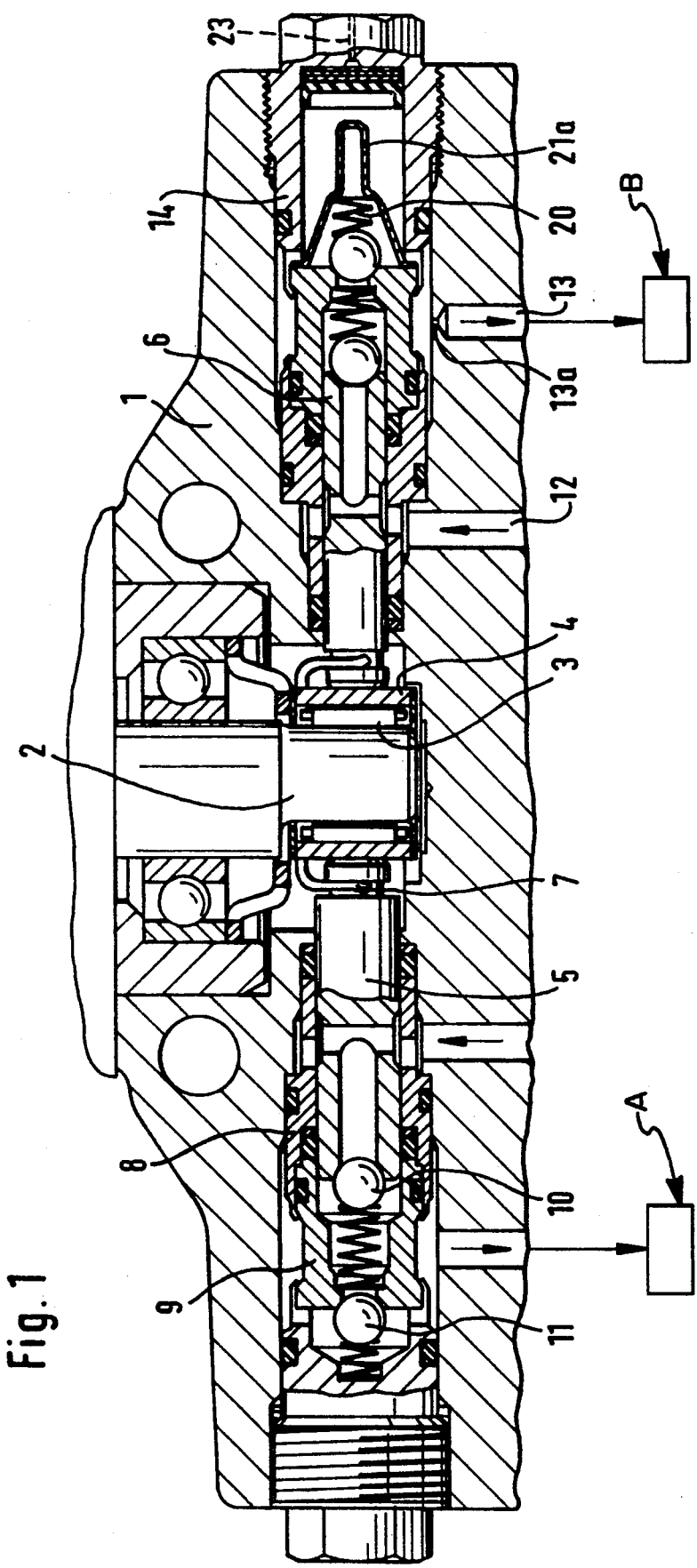
FIG. 1 is a partial cross sectional view through a first embodiment of a dual piston radial piston pump according to the invention, with either two threaded sealing plugs shown of different alternate configurations.

FIG. 1 shows a valve-controlled radial piston pump with a pump housing 1 within which the pump components are accommodated. The radial piston pump is actuated by a customary eccentric shaft-type drive. This drive has a shaft driven by an electric motor with an eccentric 2 which acts through a needle bearing 3 on an actuating ring 4.

The radial piston pump is furnished with dual cylindrical pistons 5, 6 each of which by a coupling ring 7 held in abutment against the actuating ring 4. The coupling ring 7 may alternatively be replaced by return springs acting on the pistons 5, 6. In either case, the associated piston is returned after each stroke for the suction phase, back toward the driving eccentric shaft 2.

By the action of the eccentric shaft 2, the two pistons 5, 6 are, therefore, moved to and fro along their longitudinal axis in opposite phases. In FIG. 1, piston 5 is shown in the phase of the suction stroke, piston 6 in the pressure stroke. It is noted that the diameter of the piston 5 is larger than that of the piston 6, i.e. 8 millimeters and 6 millimeters respectively.

Each one of the pistons slides within a cylindrical bushing 8 in which a cylindrical valve body 9 is crimped in each instance within a bore in an axial extension of the bushing 8.

Each pump circuit A, B is furnished with a suction valve 10 and with a discharge valve 11, each comprised of ball valves in the embodiment shown. During the suction stroke, the pump aspirates pressure fluid through each inlet 12 and the suction valve 10 and delivers the pressure stroke through the discharge valve 11 into the outlet 13 to which hydraulically actuated devices such as separate brake circuits A, B are connected in the normal case.

As noted above, the pistons 5, 6 are of different diameters, i.e., 8 and 6 millimeters for example, so that different flow rates tailored to the respective circuits A, B can be achieved with a common stroke length.

Above each piston 5, 6, a threaded sealing plug 14 is received in each bore within either end of the pump housing. The plugs secure a "cartridge" consisting of a pump piston 5, 6, a bushing 8, a valve body 9, sealing plug 14, and valves 10, 11 in the housing 1.

In FIG. 2, the piston pump of the righthand section of FIG. 1 is illustrated in an upscaled view (with a slight modification) from which the details of the pump, which will be described further in the following, can be better seen. This description applies analogously to the set-up of the other piston pump in the lefthand part of FIG. 1.

The piston 6 is furnished with a radial bore 16a with a peripheral annular chamber, which radial bore is connected through the aligned opening 15 in the bushing 8 to the inlet port 12, and with a longitudinal bore 16 which creates a connection going from the inlet port 12 to a pressure chamber 17 of the pump.

On the end, the piston 6 is formed with a valve seat 8a aligned with bore 16 for the valve ball 10 of the suction valve. The valve ball 10 is urged to its closed position by a spring 18 having one end engaging the ball 10, and is engaged at the other end with a shoulder in the valve body 9. The substantially hollow cylinder-shaped valve body 9 is formed at one end with a tapered stepped bore at whose outlet a valve seat 19 for the valve ball 11 of the discharge valve is formed. The valve ball 11 is retained in its closing position by engagement of one end of a spring 20, the other end seated in a recess 21 in a threaded sealing plug 14.

As an alternative to this, a mounting for the spring 20 is illustrated in FIG. 1 may comprise a cap 21a fixed to the outlet end of the valve body 9.

The threaded sealing plug 14 has an interior space comprising a damping chamber 14a having an endwall against which is arranged a damping pack 22, comprised of at least one diaphragm 22a and of a cup-shaped boot 22b fixed thereto which bring about an additional damping of the pressure pulsations and silencing in the high-pressure circuit of the pump. The end wall of the sealing plug damping chamber 14A may be slightly curved outwardly to improve the effect. The reverse flow through outlet valve 11 into chamber 14A and thence to chamber 24 assists in the damping effects.

The end wall of the threaded sealing plug 14 is furnished with a bore 23 which permanently vents the space behind the diaphragm 22a to the atmosphere, so that any yielding of the diaphragm 22a depends exclusively on the pressure in the damping chamber 14a.

The bushing 8 is coupled to the valve body 9 by gripping of a seal 8b and through a crimped beading 8c of a thin tubular extension 8c of the bushing 8. Similarly, the other end of the valve body 9 is beaded by a crimped beading 14b in a thin wall tubular extension 14c of the threaded sealing plug 14 to the threaded sealing plug 14. In this configuration, the valve body 9 is surrounded by an additional pressure chamber 24 communicating with the outlet port 13, and also connected through a slot 25 in the tubular extension 14b to the damping chamber 14a. As an alternative, the slot 25 may be replaced by a passage bore through extension 14c. Optionally, a restriction (not shown) may be provided as well.

Two damping in series chambers 14a and 24 are thus formed, which create improved damping of the pressure pulsation fronts caused by the pumping action. This damping effect can be enhanced by a restriction 13a (FIG. 1) which is positioned in the outlet port 13.

The piston 6 is surrounded by seals 6a and 6b in the bushing 8 which prevent fluid which is being aspirated at the low-pressure inlet 12 to leak out on the side of the piston 6, respectively in the direction of the valve body 9.

The seals 6a and 6b are elastomeric rings, seal 6b compressed between axially facing opposing surfaces on the bushing 8 and valve body 9, comprised of an end of the valve body 9 and a shoulder of the bushing 8. The seal 6b seals against the inner radial surface of the bushing 8 and the outer radial surface of the piston 6. The seal 6a is compressed between axially facing opposing surfaces on the bushing 8 and housing 1, comprised of the other end of the bushing 8 and a shoulder 1a in the housing 1 and seals against an inner radial surface of the housing 1 and the outer radial surface of the piston 6.

The threaded sealing plug 14 is axially advanced in a threaded bore 1c of the housing 1 to engage the other end of the valve body 9 and exert an axial compressing force on the seals 6a, 6b. The extent of compression is limited by shoulders 1d, 8d.

The pump unit is furnished with two further seals, preferably with O-rings 91 and 14b which seal off the cartridge with respect to the pump housing 1. Due to their elasticity, the O-rings also serve simultaneously as a noise abating element by allowing "breathing" of the fluid pressure.

This effect can be enhanced by an arrangement of the O-rings in accordance with FIG. 3. A supporting ring 9b is associated with the O-ring 6b, at which a shaft spring positioned in the sealing groove, optionally constituted by a cup spring 9c, takes support. In this way, the sealing arrangement is allowed to "breath", in particular, also in axial direction and to thereby abate any noises.

This applies analogously also to the seal 14b and, if existing, to other seals of the pump as well.

The mode of functioning of the illustrated pump is as follows: in the event of the pressure stroke (which is illustrated in FIG. 2), the piston 6 will be moved to the right. The compressed spring 18 urges the valve ball 10 against the valve seat 8a. The suction valve will, therefore, be in the closed condition. The pressure which is building up within the chamber 17 will lift the valve ball 11 off from the valve seat 19 against the force of the spring 20. The discharge valve will, therefore, be open and will connect the pressure chamber 17 to the outlet 13.

In the suction phase, the piston 6 will be moved by the drive pulling the coupling ring 7 to the left. As a result, the discharge valve 11 will close due to the pressure-relieving within the pressure chamber 17 and under the action of the spring 20. At the same time, the valve ball 10 will be lifted off from the valve seat 8a as a result of the pressure-relieving, and fluid will flow through the inlet 12 and through the bores 16a, 15, 16 into the pressure chamber 17. The cycle will then be repeated.

The illustrated pump is used with particular advantage as a hydraulic supply in automotive anti-locking control/traction slip control systems.

The invention offers the following advantages:
very simple-design, compact set-up;
each of mounting;
may be manufactured at low cost;
the pump housing is without precision machining; only the piston and the valve seats comprise precision components;
free selection of material of construction for the pump housing;
the suction valve is within the piston (slim design);
increased safety against leakage is provided due to the piston being sealed with respect to the atmosphere in the low-pressure range;
the noise abatement measures are integrated into the sealing plugs;
the pump unit forms a pre-assembly unit being comprised of the piston, the bushing, the suction valve and the discharge valve including the valve body, affording ease of mounting due to a "cartridge" solution, and the pump unit is thus pre-testable, particularly sensitive components;
optimum harmonization of the delivery rate is achieved with the using device rendered possible due to different piston diameters as, for example, 6 and 8 millimeters.

We claim:

1. A radial piston pump comprising:
a pump housing;
at least one elongated piston received within said housing;
drive means for reciprocating said piston;
an elongated valve body mounted in said housing having a bore extending within said one end,
said piston projecting into said valve body bore and being slidably received therein and having an end terminating in said valve body bore;
a pressure chamber defined by said valve body bore and said piston end;
an inlet passage formed in said piston and extending along into said pressure chamber;
an inlet port in said housing and means placing said inlet port in communication with said inlet passage;
suction valve means controlling communication of said inlet passage and said inlet passage to allow inflow of fluid as only as said piston is retracted;
an outlet port in said housing;
outlet passage means in said valve body extending out of said pressure chamber and means placing said outlet passage in communication with said outlet port;
discharge valve means establishing communication between said outlet passage means and said pressure chamber only as said piston is advanced;
a sealing plug mounted in said housing and having an end position engaging said other end of said valve body;
said sealing plug formed with a cavity receiving flow from outlet passage;
an outlet chamber surrounding said other end of said valve body extending away from said sealing plug, said discharge port entering said outlet chamber at a point away from said sealing plug; and,
a flow passage through said end portion of said sealing plug extending into said outlet chamber whereby discharge flow passes towards said sealing plug into said cavity and reversely into said outlet chamber to said discharge port.

2. The radial piston pump according to claim 1 wherein said end portion of said sealing plug comprises a tubular extension extending over said other end of said valve body and wherein said flow passage comprises at least one slot formed through said tubular extension of said sealing plug.

3. The radial piston pump according to claim 1 wherein said cavity has an end wall spaced away from said other end of said valve body, and wherein a diaphragm is installed against and over said end wall.

4. The radial piston pump according to claim 3 wherein a vent to atmosphere extends through said end wall.

5. A radial piston pump comprising:
a pump housing;
at least one elongated piston received within said housing;
drive means for reciprocating said pistons;
an elongated bushing mounted within said housing and having a bore slidingly receiving said piston;
an elongated valve body, and means mounting said valve body at one end to said one end of said bushing, said valve body having a bore extending within said one end thereof;

said piston projecting from said bushing bore into said valve body bore and being slidably received therein and having an end terminating in said valve body bore;

a pressure chamber defined by said valve body bore and said piston end;

an inlet passage formed in said piston and extending along the length of said piston and into said pressure chamber;

an inlet port in said housing and means placing said inlet port in communication with said inlet passage;

suction valve means controlling communication of said inlet passage and said inlet passage to allow inflow of fluid only as said piston is retracted;

an outlet port in said housing;

outlet passage means in said valve body extending out of said pressure chamber and means placing said outlet passage in communication with said outlet port;

discharge valve means establishing communication between said outlet passage means and said pressure chamber only as said piston is advanced;

a first seal interposed between axially facing opposing surfaces on said valve body and said housing, said seal disposed within an inner radial surface of said bushing and surrounding an outer radial surface of said piston;

a second seal interposed between axially facing opposing surfaces on said bushing and said housing, said second seal disposed within an inner radial surface of said housing and surrounding said outer radial surface of said piston at an axially spaced location from said first seal; and means for exerting an axial pressure on said valve body and bushing to compress said first and second seals to cause engagement of each seal with said outer radial surface of said piston.

6. A radial piston pump according to claim 5 wherein said means for exerting an axial pressure comprises a threaded sealing plug threaded into a tore in said housing, a portion of said sealing plug engaging the other end of said valve body.

7. A radial piston pump according to claim 6 wherein said threaded sealing plug is formed with a cavity open towards said valve body, said outlet passage extending into said cavity, an annular chamber surrounding said valve body at said other end, said discharge port entering into said annular chamber, said sealing plug including a portion extending to said other end of said valve body, said means establishing communication between said outlet passage and said discharge port including at least one flow passage from said cavity to said annular surrounding chamber.

8. A radial piston pump according to claim 6 wherein said threaded sealing plug includes a tubular extension fit over said other end of said valve body and crimped thereto and wherein said bushing is formed with a tubular extension extending over said one end of said valve body and crimped thereto, comprising said means mounting said bushing to said valve body.

9. A radial piston pump according to claim 6 wherein said piston is retained in said bushing by engagement of at least one of said seals and wherein said sealing plug is secured to said valve body, whereby said bushing valve body, piston and sealing plug are held together as a unit to form a cartridge which may be preassembled and installed into said housing.

10. A radial piston pump according to claim 9 wherein said suction valve means is mounted within said valve body in said pressure chamber and said discharge valve means is mounted within said sealing plug extension, whereby said cartridge contains said suction and discharge valve means.

11. A radial piston pump according to claim 9 further including housing seals interfit between portions of said cartridge and said housing which seals are elastic to allow expansion resulting from fluid pressure exerted thereon.

12. A radial piston pump according to claim 11 further including a spring ring engaging at least one of said housing seals resiliently allowing axial movement thereof.

13. A hydraulic radial-type piston pump including a housing, a cylindrical bushing fit within said housing, a cylindrical valve body, fixed at one end to said bushing body, at least one cylindrical piston performing working strokes and which is slidingly accommodated within said bushing, a pressure chamber defined at one end of said piston; a suction and a discharge valve, positioned in line along the longitudinal axis of said piston, said suction and discharge valves opened, and closed respectively by pressure in said pressure chamber, said suction valve having a valve seat at said end of the piston, an inlet port in said housing for receiving the hydraulic fluid to be aspirated and with an outlet port in said housing for receiving the pressurized hydraulic fluid, said pressure chamber being located within said valve body, said discharge valve having a valve seat located at one end of said valve body, a pair of axially spaced annular seals adjacent respective axially facing surfaces of said bushing, one of said surfaces adjacent and facing an opposing, axially facing surface on said valve body, one of said seals interposed between said opposing axially facing surfaces on said bushing and valve body and disposed within an inner radial surface of said bushing, said other axially facing surface on said bushing adjacent an opposing axially facing surface on said housing, the other of said seals interposed between said axially facing surfaces on said bushing and housing and disposed within an inner radial surface on said housing, said seals surrounding the outer radial surface of said piston at axially spaced locations, and means applying an axial force acting to compress said seals between said axially facing surfaces on said bushing and said adjacent portions of said valve body and housing respectively to be forced into sealing engagement with said outer radial surface of said piston.

14. A radial piston pump as claimed in claim 13 wherein a seal is provided between said bushing and said valve body.

15. A radial piston pump as claimed in claim 13 wherein said suction valve and the said discharge valve each comprise a spring-loaded ball valve.

16. A radial piston pump as claimed in claim 13 including at least two pistons, said pump combined with a two circuit hydraulic antiblock brake system for vehicles, wherein each one of the said two pistons supplies a respective brake circuit with pressurized hydraulic fluid, and wherein said two pistons have different diameters.

17. A radial piston pump as claimed in claim 13 further including a threaded sealing plug received in said housing and engaging said valve body, said threaded sealing plug comprising said means exerting said axial force on said bushing acting through said valve body.

18. A radial piston pump as claimed in claim 17 further including seals sealing off said bushing and sealing plug to said pump housing.

19. A radial piston pump as claimed in claim 18 wherein said seals comprise an O-rings and a spring element retained within an axially extending groove in the said bushing and in said threaded sealing plug.

20. A radial piston pump as claimed in claim 13 wherein said piston, said bushing, and said valve body form one unit which may be separately assembled as a cartridge.

21. A radial piston pump as claimed in claim 17 wherein said threaded plug is formed with a cavity receiving flow from said pressure chamber to comprise a damping chamber.

22. A radial piston pump as claimed in claim 21 wherein said valve body is surrounded by an annular pressure chamber hydraulically communicating with said damping chamber said pressure chamber connected to said outlet port.

23. A radial piston pump as claimed in claim 22 wherein a restriction is in said outlet port.

24. A radial piston pump as claimed in claim 21 wherein said damping chamber is formed with an outwardly curving endwall, and wherein at least one damping diaphragm is within the said damping chamber against said endwall.

25. A radial piston pump as claimed in claim 24 wherein said threaded sealing plug is furnished with a vent opening behind said diaphragm.

* * * * *